Figure 2:
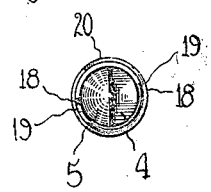

H. NITTEBERG.
TOOL.
APPLICATION FILED MAR. 22, 1915.

1,149,398.

Patented Aug. 10, 1915.

Witnesses
Karl H. Butler
Chas. W. Stauffiger

Inventor
Harold Nitteberg
By
Attorneys

UNITED STATES PATENT OFFICE.

HAROLD NITTEBERG, OF DETROIT, MICHIGAN.

TOOL.

1,149,398.

Specification of Letters Patent. Patented Aug. 10, 1915.

Application filed March 22, 1915. Serial No. 15,999.

*To all whom it may concern:*

Be it known that I, HAROLD NITTEBERG, a subject of the King of Norway, residing at Detroit, in the county of Wayne and State of Michigan, have invented certain new and useful Improvements in Tools, of which the following is a specification, reference being had therein to the accompanying drawings.

This invention relates to a combined drill and center reamer for presses and lathes, and the primary object of my invention is to provide a tool of the above type with a novel reversible and detachable sleeve, which permit of either end of the tool being housed or inclosed while the opposite end thereof is used.

Another object of this invention is to provide a combined drill and center reamer wherein a novel drill chuck is furnished with means for preventing rotation of a drill or instrument held by the chuck.

The above and other objects are attained by a tool wherein the parts are constructed with a view of reducing the cost of manufacture and at the same time retain the features by which accuracy, durability, simplicity and ease of assembling are secured, and with such ends in view, my invention resides in the novel construction to be hereinafter specifically described and then claimed.

Reference will now be had to the drawing, wherein—

Figure 1:
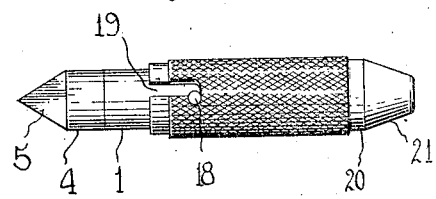
Figure 3:
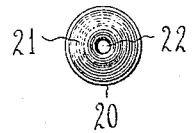
Figure 4:
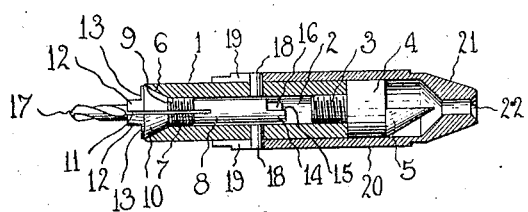
Figure 5:
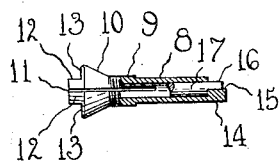

Figure 1 is a side elevation of a tool in accordance with this invention; Fig. 2 is a view of one end of the tool; Fig. 3 is a view of the opposite end thereof; Fig. 4 is a longitudinal sectional view of the tool, and Fig. 5 is an elevation of a detached drill chuck, partly broken away and partly in section.

A tool in accordance with this invention comprises a barrel 1 and at one end of the barrel the walls of the bore 2 thereof are screwthreaded to receive the screwthreaded shank 3 of a reamer 4, said reamer corresponding in diameter to the barrel 1 and abutting the end thereof. The reamer 4 has a suitable cutter or bit 5.

The walls of the bore 2 at the opposite ends of the barrel 1 are tapered outwardly to provide a conical seat 6 and the walls adjacent to the seat 6 are screwthreaded, as at 7. This end of the barrel receives a drill chuck, comprising a tubular member 8 having an exteriorly screwthreaded portion 9 to engage the screwthreads 7 and a conical head 10 to engage the seat 6 of the barrel 1. The conical head 10 is slitted, as at 11 to provide opposed compressible gripping jaws 12 and said jaws are cut away, as at 13 to provide facets adapted to accommodate a spanner wrench or other tool employed for mounting the drill chuck in the barrel. The slits of the drill chuck extend approximately half the length of the tubular member 8 and at the inner end of said member is a stop 14 having a flat face 15 adapted to be engaged by the semi-cylindrical end 16 of a tool shank 17 placed in the chuck. The tool shank 17 is adapted to be clamped between the jaws or sections of the conical head 10 by the jaws or sections being compressed when the conical head is seated in the end of the barrel 1. The stop 14 and the semi-cylindrical end 16 of the drill shank are adapted to prevent the drill from rotating relative to the chuck even though the jaws 12 do not firmly grip the drill shank.

The barrel 1, intermediate the ends thereof, is provided with diametrically opposed pins 18 adapted to extend into bayonet shaped slots 19 provided therefor in the ends of a sleeve 20 placed upon the barrel 1. The sleeve 20, for the greater part of its length is knurled or roughened to facilitate shifting the sleeve upon the barrel and one end of the sleeve terminates in a nose 21 having an axial opening 22 adapted to receive the center pin or stud of the head stock of a lathe. The manner of detachably mounting the sleeve 20 upon the barrel 1 permits of the sleeve being placed upon the barrel 1 to inclose the drill chuck end thereof, thus permitting of the reamer end of the tool being used.

It is thought that the utility of a combination drill and center reamer will be apparent to artisans skilled in the use of lathes and drill chucks, and while in the drawings there is illustrated a preferred embodiment of my invention, it is to be understood that the structural elements are susceptible to such variations and modifications as fall within the scope of the appended claims.

What I claim is:—

1. A tool of the type described comprising a barrel, a chuck detachably mounted in an end thereof, a non-rotatable drill adapted to be held by said chuck, and a sleeve detachably mounted upon said barrel and having a nose adapted to inclose an end of said barrel, the nose of said sleeve having an axial opening therein.

2. A tool of the type described, comprising a barrel, a reamer in screwthreaded engagement with one end thereof, a drill chuck detachably connected to the opposite end of said barrel, a drill non-rotatably mounted in said chuck, and a sleeve on said barrel having a pin and bayonet slot connection therewith, said sleeve having a nose provided with an axial opening.

In testimony whereof I affix my signature in presence of two witnesses.

HAROLD NITTEBERG.

Witnesses:
ANNA M. DORR,
KARL H. BUTLER.

Copies of this patent may be obtained for five cents each, by addressing the "Commissioner of Patents, Washington, D. C."